United States Patent [19]

Okada

[11] 4,423,872
[45] Jan. 3, 1984

[54] PINBALL GAME

[75] Inventor: Kazuo Okada, Tokyo, Japan

[73] Assignee: Kabushiki Kaisha Universal, Tochigi, Japan

[21] Appl. No.: 175,683

[22] Filed: Aug. 5, 1980

[30] Foreign Application Priority Data

| Aug. 11, 1979 | [JP] | Japan | 54-101804 |
| Nov. 19, 1979 | [JP] | Japan | 54-148870 |
| Nov. 19, 1979 | [JP] | Japan | 54-148871 |

[51] Int. Cl.³ .................. A63F 7/00; A63D 3/02
[52] U.S. Cl. ........................ 273/121 A; 273/124 A; 273/129 S
[58] Field of Search .......... 273/124 R, 124 A, 121 A, 273/DIG. 8, 121 R, 122 R, 118 R, 119 R, 129 S, 118 A, 119 A, 120 A, 122 A, 123 A, 125 A, 127 R, DIG. 5, 129 S

[56] References Cited

U.S. PATENT DOCUMENTS

| 637,549 | 11/1899 | Engel et al. | 273/119 R X |
| 1,005,859 | 10/1911 | Lynn | 273/124 R |
| 2,514,994 | 7/1950 | Falk | 273/129 S X |
| 2,547,164 | 4/1951 | Lemke | 273/121 A X |
| 2,731,266 | 1/1956 | Neilson | 273/121 A |
| 2,943,858 | 7/1960 | Slater | 273/118 R |
| 3,292,237 | 12/1966 | Fisher | 273/DIG. 5 |
| 3,782,724 | 1/1974 | Rottman et al. | 273/DIG. 8 X |
| 4,247,109 | 1/1981 | Horan et al. | 273/121 A |

OTHER PUBLICATIONS

Basic Bodywork and Painting, Petersen Publishing Company, 1975, p. 186.
DuPont Refinisher News, Sep.–Oct. 1979, No. 217, p. 9.

Primary Examiner—George J. Marlo
Attorney, Agent, or Firm—Young & Thompson

[57] ABSTRACT

A playing field board for pinball game machines which is assembled with a playing surface thereof inclined, and along the inclined playing surface of which a round ball rolls downwardly by gravity and is driven upwardly by means of kicker apparatus, is made of a steel sheet and a transparent plastic layer of synthetic resin, e.g. urethane, disposed on the surface of the steel sheet. Between the steel sheet and the plastic layer of synthetic resin comprising the playing field, a buffer such as paper sheeting is interposed to dampen the noises made by a ball rolling along the playing surface of the playing field.

3 Claims, 9 Drawing Figures

PINBALL GAME

BACKGROUND OF THE INVENTION

The present invention relates generally to a playing field board suitable for use in pinball game machines.

More particularly, the present invention relates to a playing field board comprising a steel sheet, on one surface of which at least one thin layer of synthetic resin is applied.

Pinball game machines are generally comprised of a playing field board, target apparatus, kicker apparatus, passageways through which a round ball passes, and the like. In such pinball game machines, when a ball strikes the targets and kicker apparatus, or passes through the passageways, predetermined points are added to a total score obtained up to this time.

Playing field boards used for conventional pinball game machines are made of a plywood plate about 1.5 to 2.0 cm thick. However, it is disadvantageous to use plywood plates as a playing field board in a pinball game machine, since the cost of plywood has recently gone up sharply and consequently pinball game machines become expensive. It is also disadvantageous to use plywood plates as a playing field board in a pinball game machine, because on the under surface of a playing field board holding means for mounting illumination lamps, solenoids and the like are attached by wood screws, so that it is troublesome to fit them onto the playing field board if the latter is not readily penetrable.

Recently there have been employed plastic boards made of acrylic resin sheet instead of plywood. In this case, it is also difficult to fix holding means similarly to the case of employing plywood. Furthermore, the surface of a plastic board is easily scratched by a ball rolling along it and is easily soiled in that dust is attached to the surface of the plastic board by static electricity.

OBJECTS OF THE INVENTION

It is accordingly a principal object of the present invention to provide a playing field board for pinball game machines, which is simple and inexpensive to manufacture.

Another object of the present invention is to provide a playing field board which can be easily assembled into a pinball game machine.

Another object of the invention is the provision of such a playing field board, which diminishes the noises made by a ball rolling along the playing surface of the playing field board.

Still another object of the present invention is the provision of such a playing field board, along the surface of which a ball may roll as if the ball were attracted by the playing surface of the playing field board so that the ball behaves as though it were massive.

A further object of the present invention is the provision of a playing field board, which is hardly distorted even if the temperature and the humidity rise.

Finally, it is an object of the present invention to provide such a playing field board, which will be attractive in appearance.

SUMMARY OF THE INVENTION

The objects of the present invention are achieved by providing playing field boards for pinball game machines, which utilize a steel sheet as a base plate and the surface of which is layered with a synthetic resin layer. Iron sheets, or sheets of aluminum alloy and the like, all of which have advantages over plywood plates in being inexpensive and more readily obtainable, may be employed in lieu of a steel sheet. In addition, utilizing these steel sheets for a play field board makes it possible to machine them with a high accuracy and to fix holding means on the base plate by means of welding. Consequently, screwing on holding means by hand as in the past will be unnecessary, so that it is possible to produce them mechanically on a large scale.

Although it is, on the one hand, advantageous in mass production and as to production cost, to utilize steel sheets as the base of a playing field board; on the other hand, a ball rolls with unpleasant noises along the surface of such a playing field board. The present invention solves this problem by providing a plastic layer of synthetic resin over the surface of the steel sheet.

A plastic layer of synthetic resin may be provided either by spreading a synthetic resin paint on the surface of the base plate or by adhering a plastic sheet of synthetic resin thereon. Synthetic resin paints, such as phenolic resin, xylenol aldehyde resin, alkyd resin, unsaturated polyester resin, epoxide resin, polymethacrylate resin, polyether resin, polyurethane resin, silicone resin, and natural rubber and the like, hereinafter called elastomeric material, are suitable.

A synthetic resin layer must be elastic, to be capable of being spread thick, to adhere easily to the surface of the metal, and to be finished with the surface being flat, in order that noises are drowned effectively and sufficiently and a ball can roll smoothly. And it is also required to be durable in order to prevent the surface from being scratched.

Taking these requirements into consideration, paints of the group of polyurethane resins are desirable for the surface layer, and more especially paints of the type of catalytic curing resins comprising pre-polymers and amino catalysts are satisfactory. An example is polyurethane No. 5000 clear or polyurethane No. 100 clear (both of which are sold by Nihon Yushi Co., Ltd., of Japan).

The layer of such synthetic resins is desirably thickly applied in order to increase its noise-drowning effect. Practically, it may be about 0.15 to 1.0 mm in thickness.

Further it will be also desirable to add agents to paint for preventing electrostatic charge, or lubricating agents for causing a ball to roll smoothly along the playing surface.

When adhering a synthetic resin sheet to the base plate of a playing field board, it is desirable to use the synthetic resin sheets such as nylon resin, vinyl resin, polyester resin and the like. Especially it will be more desirable to have a certain degree of hardness of the surface of the synthetic resin sheet so as to prevent wear by a ball. In case of the sheet being lower in hardness, it is more effective to apply a protective layer such as an acrylic resin layer.

On the other hand, in the known ways in which a synthetic resin paint is layered on a base plate, the layer of a synthetic resin should be of sufficient thickness. Hence a paper sheet is adhered to the surface of the base plate as a buffer and then, preferably, a protective layer of synthetic resin paint such as a paint of the group comprised by melamine resin, acrylic resin, urethane resin and the like is applied by means of a spray gun or a roll coater. It will be apparent that such a protective layer is necessary to be wear-resistant for preventing the surface from being scratched by a ball.

DETAILED DESCRIPTION OF THE INVENTION

Figure 1:
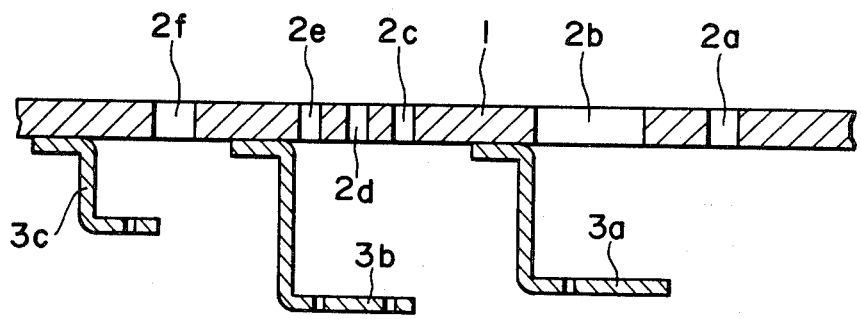
FIGS. 1 to 6 are cross-sectional views to show a manufacturing process of a playing field board to which a synthetic resin layer is applied by spreading in accordance with the present invention.

Referring now to the drawings in greater detail, and first to FIGS. 1 to 6 thereof, a playing field base plate is shaped from a steel sheet (cold rolled steel plate) of about 1.6 to 2 mm thickness according to the shape of the playing field. In order to prevent the playing field base plate 1 of steel sheet from deforming, if necessary, on the marginal edge of the base plate 1, reinforcing members of V-shaped cross section may be fixed, or between two base plates a reinforcing plate shaped like a honeycomb may be interposed. There are die-stamped apertures in the base plate 1, formed with a press machine. For example, in this embodiment, an aperture 2a is for a post to be mounted therein, an aperture 2b is for an elongated contacting needle, apertures 2c, 2d and 2e are for kickers and aperture 2f is for a synthetic resin member to be plugged up therein. To the under side of the base plate, holding means 3a, 3b and 3c are secured by means of spot welding.

Figure 2:
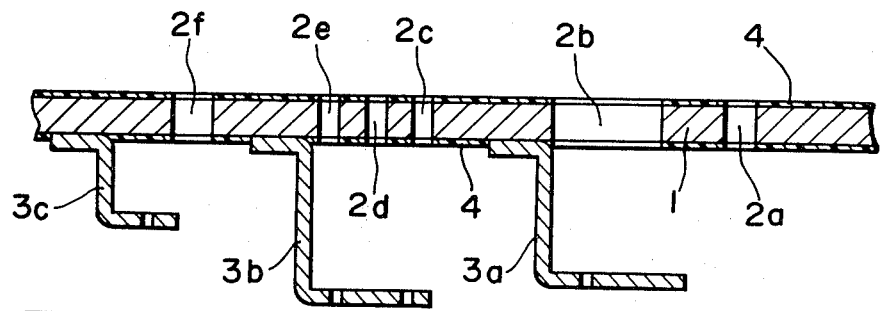
Figure 3:
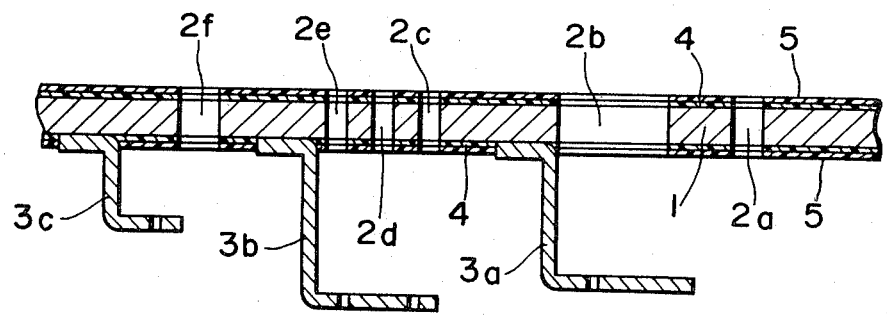

Referring now to FIG. 1, after the completion of the apertures and of spot-welding the holder means to the base plate, a parkerizing treatment will be performed by immersing the base plate in a zinc phosphate solution. As a result of the parkerizing treatment, the surface of the base plate 1 is coated with a thin film 4 of zinc phosphate as shown in FIG. 2. However, in the case of using aluminum alloy as a base plate, a parkerizing treatment is not required.

After that, the steel sheet 1 is spread with melamine synthetic resin 5 as a priming coat on both surfaces thereof, and then it is heated to bake the finish.

Figure 4:
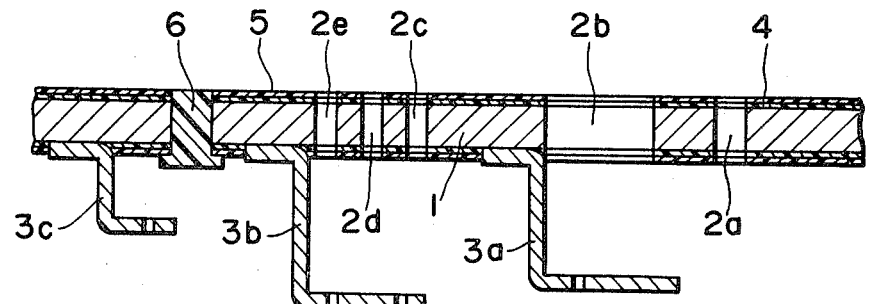

Turning now to FIG. 4, after the completion of said baking finish of melanine synthetic resin, a transparent synthetic resin plug 6 such as an acrylic resin plug is inserted in aperture 2f.

Figure 5:
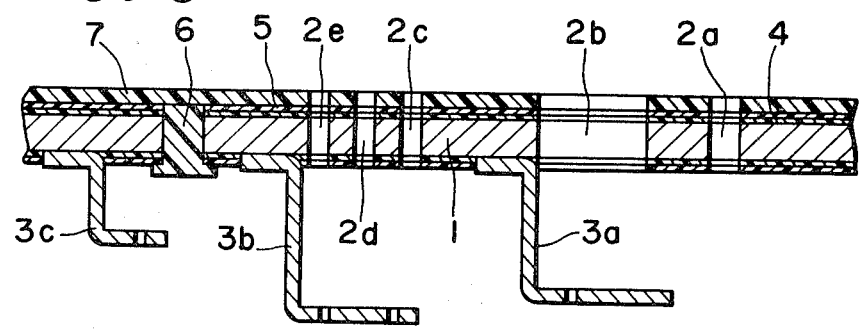

As shown in FIG. 5, the surface of the base plate finished by baking is spread uniformly with a 0.2 mm thick layer 7 of polyurethane clear paint No. 1000 (which is sold by Nihon Yushi Co., Ltd. of Japan) which is transparent and of the catalytic curing type, using a spray gun.

The base plate is left indoors and is naturally dried to cure the polyurethane resin layer 7. Preferably, a hardened protective thin layer may be coated over the polyurethane resin layer.

Furthermore, when it is necessary to print patterns on the surface of the base plate, the urethane resin layer is spread on two times. The patterns are printed on the surface of the first layer of polyurethane resin, using ink of the oxidation polymerization type; and then the second layer is applied over the first layer to protect the printed patterns.

Figure 6:
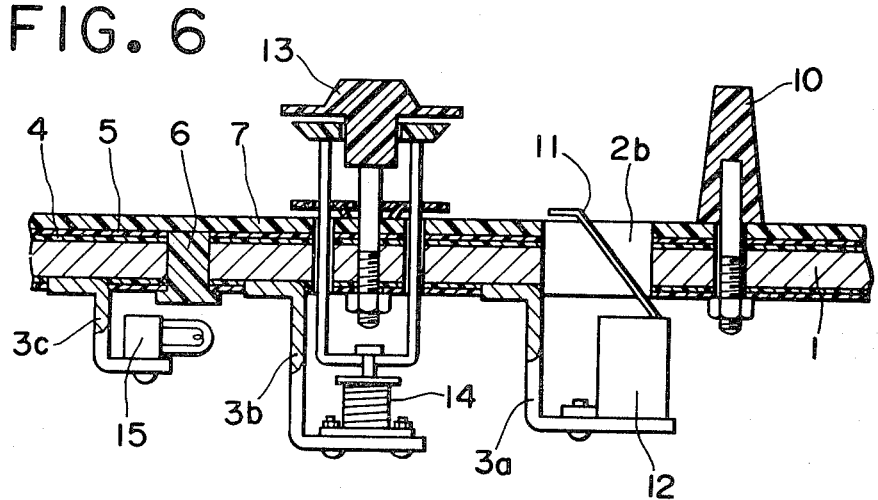

Finally, as shown in FIG. 6, additional parts will be fixed to the base plate. The post 10 is inserted into an aperture 2a and screwed to the base plate. The contacting needle 11 which will be contacted by a ball and will turn on and off the micro switch 12 mounted on the holder 3a is inserted into the aperture 2b.

In apertures 2c, 2d, 2e, kicker apparatus 13 is mounted and actuated by solenoids 14 mounted on a holder 3b. A lamp 15 which is mounted on a holder 3c illuminates said transparent resin plug 6.

Figure 7:
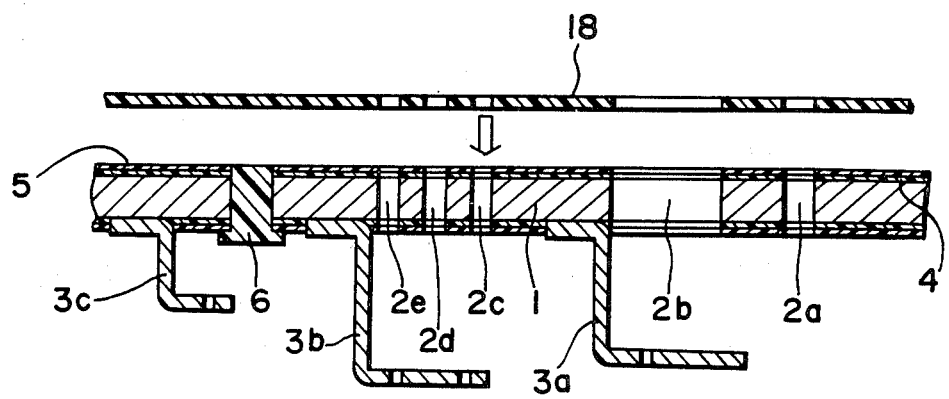
FIG. 7 is a cross-sectional view showing a process in which a synthetic resin sheet is adhered to the surface of a playing field board according to the present invention.

FIG. 7 shows another embodiment of the invention, in which the synthetic resin sheet is bonded on the surface of the steel sheet.

In this embodiment, an about 0.15 mm sheet 18 of vinyl chloride which is transparent is adhered by a suitable bonding agent. As a result of the vinyl chloride sheet adhered to the base plate, noises caused by a ball are reduced.

When it is required to print patterns on the surface of the field plate, it may be printed on the surface of the melamine resin layer 5 or on the rear surface of the vinyl chloride sheet.

After that, other parts such as kickers will be mounted as shown in FIG. 6.

Figure 8:
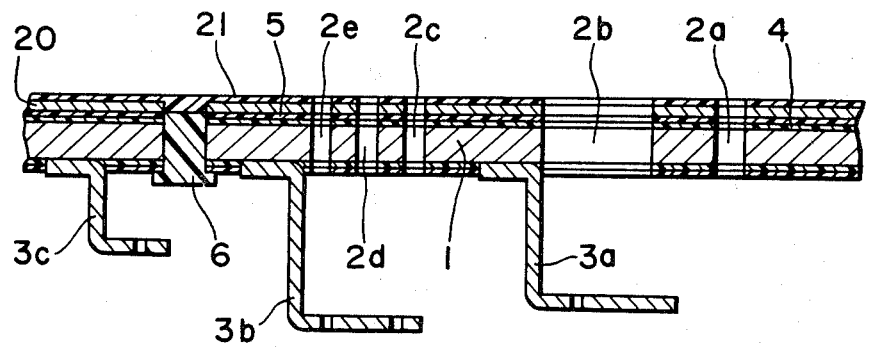
FIG. 8 is a cross-sectional view showing an embodiment of a playing field board according to the present invention in which a paper sheet is used as a buffer means.

In the embodiment shown in FIG. 8, a paper sheet 20 is used as a buffer means so that it is unnecessary to spray a synthetic resin thick layer. On the surface of the melamine resin layer 5 an about 0.1 to 0.2 mm sheet 20 of paper is adhered.

The paper sheeting is effective to reduce noises caused by a ball and to provide the playing field board with elasticity. In this embodiment, patterns to be pressed on the playing field are first pressed on the surface of the paper sheet 20. In order to protect the paper sheet, one of the resins of the melamine group, acryl group, urethane group and the like, all of which are transparent, is layered to about $10\mu$ thickness by means of a roll-coater, a spray gun or the like. Then the protective layer 21 of a synthetic resin is cured with ultraviolet irradiation or natural drying.

Ordinarily, said paper sheet 20 and the protective layer 21 of synthetic resin will be separately layered; but under certain circumstances, the paper sheet 20, on which a protective layer 21 of a synthetic resin is applied, may be adhered on the surface of said melamine resin layer 5.

Figure 9:
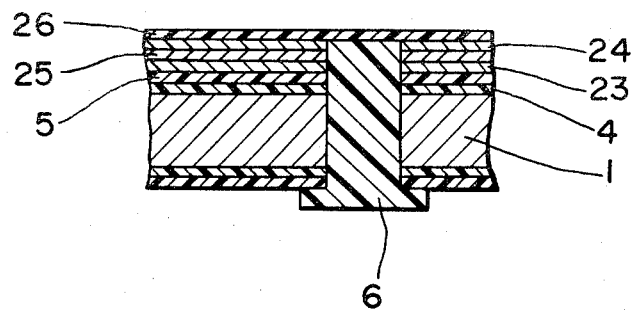
FIG. 9 is a cross-sectional view showing another embodiment of a playing field board in which a thin film of metal is interposed between two sheets of paper as buffers.

It should be noted that the paper sheeting to be adhered is carefully treated because of its expansion. For that reason, it will be desirable to interpose a metallic foil between two sheets of paper in order to prevent said paper sheet from deformation. In the embodiment shown in FIG. 9, a metallic foil 25 is interposed and adhered between two sheets of paper 23, 24. In this construction a protective layer 26 of a synthetic resin is spread on top in a thin outermost film.

What is claimed is:

1. In a pinball game machine having a playing field board along the exposed upper surface of which a ball rolls; the improvement in which the playing field board is a metal plate having at least one layer of elastomeric material applied to said surface of the metal plate, the uppermost of said at least one layer being transparent and printed material beneath said transparent layer and visible through said transparent layer, a hole through said plate, said transparent elastomeric material closing said hole, and a plug of transparent plastic disposed in said hole beneath said transparent elastomeric material.

2. Structure as claimed in claim 1, and a metal holder secured to the underside of said metal plate and extending downwardly from said board and having a support surface disposed a substantial distance below said transparent plastic plug, and an electric light carried by said support surface for shining a light upward through said plastic plug and through said transparent elastomeric material.

3. A structure as claimed in claim 2, in which said metal holder is welded to the underside of said metal plate.